(12) United States Patent
Rieder et al.

(10) Patent No.: US 6,357,754 B1
(45) Date of Patent: Mar. 19, 2002

(54) SEAL FOR A BEARING BUSH

(75) Inventors: Guido Rieder, Wilhelmsdorf; Siegfried Götz, Hausen; Manfred Würch, Aurachtal; Martin Kruppa, Herzogenaurach, all of (DE)

(73) Assignee: INA Wälzlager Schaeffler Ohg, Herzogenaurach (DE)

( * ) Notice: Subject to any disclaimer, the term of this patent is extended or adjusted under 35 U.S.C. 154(b) by 0 days.

(21) Appl. No.: 09/555,426

(22) PCT Filed: Oct. 7, 1998

(86) PCT No.: PCT/EP98/06380

§ 371 Date: May 30, 2000

§ 102(e) Date: May 30, 2000

(87) PCT Pub. No.: WO99/30064

PCT Pub. Date: Jun. 17, 1999

(30) Foreign Application Priority Data

Dec. 10, 1997 (DE) .......................................... 197 54 699

(51) Int. Cl.$^7$ ............................................... F16J 15/38
(52) U.S. Cl. ....................................... 277/394; 277/549
(58) Field of Search ................................. 277/371, 394, 277/402, 549, 553, 571; 384/486

(56) References Cited

U.S. PATENT DOCUMENTS

| 2,996,901 A | 8/1961 | Kleinschmidt |
| 3,467,395 A | 9/1969 | Kan |
| 5,269,536 A | * 12/1993 | Matsushima et al. |
| 6,050,571 A | * 4/2000 | Rieder et al. ........... 384/486 X |

FOREIGN PATENT DOCUMENTS

| DE | 69 39 294 | 3/1970 |
| DE | 73 09 981 | 11/1976 |
| DE | 86 21 426 U1 | 11/1986 |
| DE | 41 28 179 A | 2/1993 |
| DE | 44 08 831 A | 9/1995 |
| DE | 197 01 461 A | 7/1998 |

OTHER PUBLICATIONS

Wartungsfreie Kreuzgelenkbüchsen. In: Evolution, 1995, Heft 4, p. 22, 23.

* cited by examiner

Primary Examiner—Robert J. Sandy
Assistant Examiner—Karlena D. Schwing
(74) Attorney, Agent, or Firm—Henry M. Feiereisen

(57) ABSTRACT

The sealing arrangement for a bearing bushing includes a reinforced seal (2) which is arranged in force-fitting manner against the inner wall (4) of the bearing bushing (1). The reinforcement (3) of the seal (2) forms a radially inwardly directed arm (14) for attachment of a rotary shaft seal (8) which is disposed between the arm (14) and the rolling bodies (7). The seal (2) is further provided with a sealing lip (15) which faces away from the rotary shaft seal (8) and is supported by a sealing element (5). The sealing element (5) assumes the function of a protective cap and of anterior seal and includes a reinforcement ring (16) having an arm (17) circumscribing an end zone (19) of the bearing bushing (1). A radially inwardly directed flange (18) of the reinforcement ring (16) is rubberized on an end face. The rubber packing (22) further circumscribes the free end of the flange (18) and is secured in fixed rotative engagement to the pin (6).

14 Claims, 2 Drawing Sheets

SEAL FOR A BEARING BUSH

FIELD OF THE INVENTION

Figure 1:
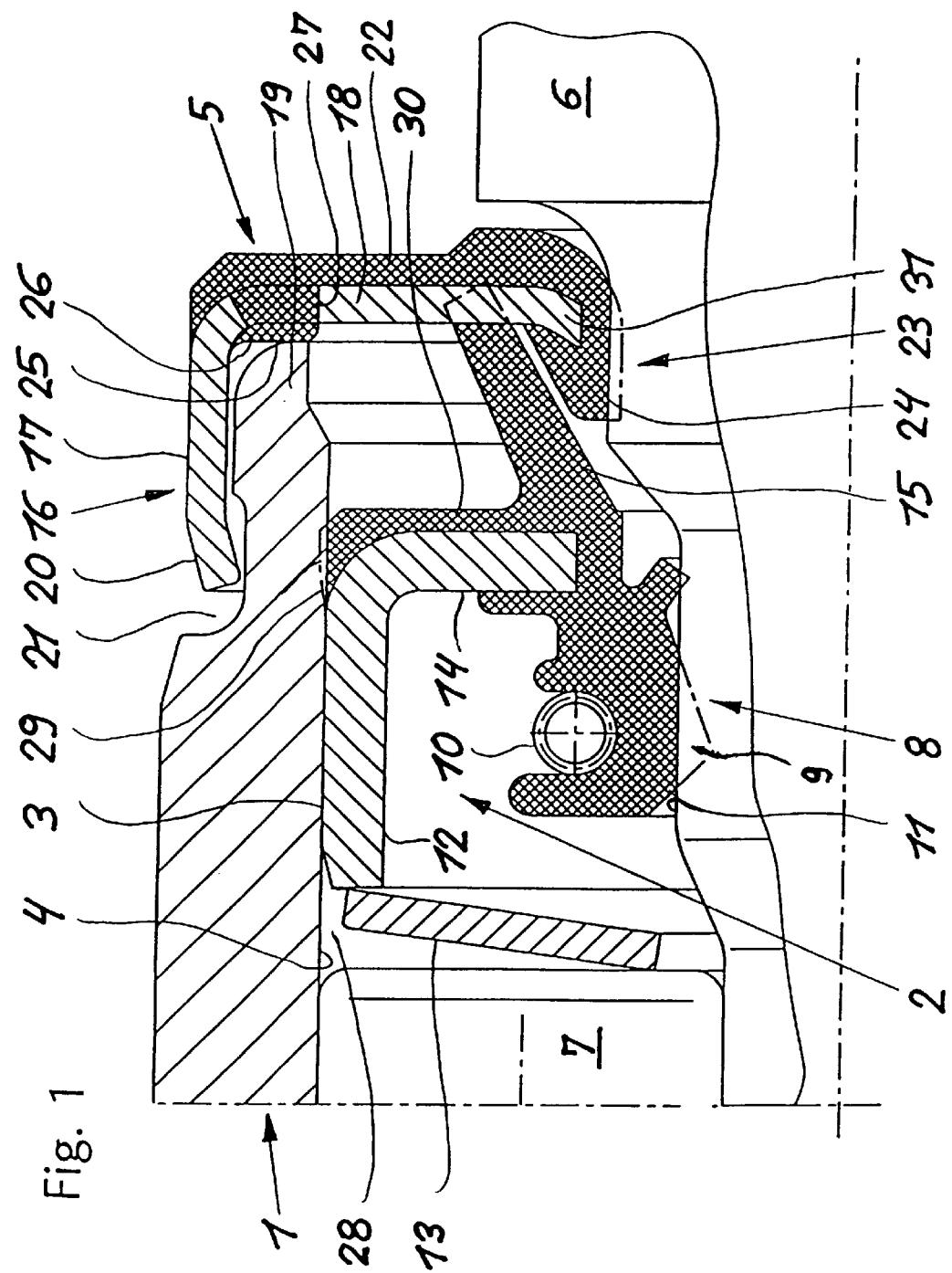

The present invention relates to a sealing arrangement for a spider bushing for insertion of pins of a cross link pertaining to a universal joint. Universal joints are used in a wide variety of technical fields, such as e.g. passenger cars, trucks, agricultural machines as well as construction machines. Hereby, universal joints are a component of a shaft which is arranged at a diffraction angle and provided for driving and thus torque transmission of a drive axle. Universal joints are exposed in these vehicles to external impacts such as dust, water, sand. These impacts require an effective seal of the universal joints to avoid a premature breakdown of the bearing bushings which causes in an undesired shutdown of the vehicle or the machine.

BACKGROUND OF THE INVENTION

A sealing arrangement for bearing bushings is known, for example, from German Pat. No. DE 41 28 179 A1 and includes a rotary shaft seal as well as an anterior seal in fixed rotative engagement with the pin. The rotary shaft seal is so installed in the bearing bushing that its sealing lip, which is pressed by a garter spring against the outer surface area of the pin, is positioned between the anterior seal and a radial arm of the reinforcement. The cylindrical arm of the reinforcement is chamfered and engages in an annular recess of the bearing bushing, when installed, to thereby ensure a correct positioning of the reinforcement that is associated to the rotary shaft seal. The rotary shaft seal has a further sealing lip which is supported by a slanted surface of the rubber packing of the anterior seal. The anterior seal is mounted in fixed rotative engagement to the pin and has a reinforcement having on the side confronting the bearing bushing a U-shaped configuration which is completely enveloped by a rubber packing. The rubber packing is thereby supported by an end face of the bearing bushing and forms a sealing lip which bears abrasively upon the bearing bushing in a radial groove. This known prior art is able to effectively seal the bearing bushings. However, its construction requires increased manufacturing costs, in particular when providing a recess to lock the reinforcement of the rotary shaft seal. Moreover, the known sealing arrangement requires great care for installation. As a consequence of the configuration of the sealing lip, positioned anteriorly of the rotary shaft seal, there is a risk that the sealing lip will not bear against the intended slanted surface of the anterior seal, but against a projecting extension of the anterior seal, so that the operativeness of the rotary shaft seal becomes impaired. Furthermore, as the sealing lip of the anterior seal engages the radial groove of the bearing bushing, the assembly requires increased attention to prevent damage during installation.

OBJECT OF THE INVENTION

The invention is based on the object to provide an effective sealing arrangement which is inexpensive to produce and easy to install.

SUMMARY OF THE INVENTION

The problem, stated above, is solved in accordance with the invention by uniting a reinforcement ring for realizing the function of a protective cap with an anterior seal to form a sealing element. Hereby, the reinforcement ring includes a radial flange which covers a circular ring shaped opening between the pin and the bearing bushing and extends to an area close to the outer surface area of the pin. A sealing lip is connected in one piece with the rotary shaft seal and is supported by the inner side of the radial flange of the reinforcement ring. A disk-like rubber packing is vulcanized to the bearing bushing distal end face of the radial flange and encompasses the free end of the flange at formation of a ring part which projects out beyond the flange on both sides thereof and is mounted in fixed rotative engagement to the outer surface area of the pin. Furthermore, the rubber packing forms a spacer element which is disposed between the end face of the bearing bushing and the flange of the reinforcement ring when installed. The spacer element is thereby connected in one piece with the end face of disk-like rubber packing via recesses in the flange of the reinforcement ring. The invention hereby includes a circumferentially closed spacer element as well as a spacer element which is disposed in sections.

The sealing element according to the invention has the advantage that in the main contamination direction the structure does not have any components which form a disadvantageous gap. Further, the sealing element is characterized by a simple structure that is easy and inexpensively to make. Also, the installation does not require particular attention as no risk exists for the sealing lip to get damaged or displaced. As the sealing lip, which is associated to the rotary shaft seal, is slanted outwardly, the contact surface of this sealing lip shifts radially outwards during axial installation of the sealing element according to the invention, whereby this zone is not confined.

According to a preferred embodiment of the invention, the reinforcement ring is provided with a cylindrical extension which encompasses at a radial distance an end zone of the bearing bushing. This end zone of the bearing bushing is thereby radially recessed so that the outer contour of the installed sealing element does not project beyond the outer surface area of the bearing bushing. The cylindrical extension of the reinforcement ring has a free end which is provided with radially inwardly directed bends or flanges which lock in a circumferential groove of the bearing bushing. Hereby, it is provided in accordance with the invention that the flanges are formed at the cylindrical extension of the reinforcement ring, preferably after the sealing element has been installed.

According to an advantageous configuration of the invention, the cylindrical extension of the reinforcement ring has a free end provided with circumferentially disposed locking lugs which lock spontaneously in the circumferential groove when the fitting position has been realized. The locking lugs are thereby so configured that their overlap with respect to the recessed outer surface area of the bearing bushing is in the range of the elasticity of the reinforcement ring. Through this design, it is possible to implement, before installation, the securement of the sealing element on the reinforcement ring. During installation, the cylindrical extension of the reinforcement ring of the reinforcement ring expands radially until reaching the circumferential groove in which the locking lugs engage. A simplified installation can be attained when the cylindrical extension of the reinforcement ring is provided with circumferentially spaced axial slits.

It is further provided in accordance with the invention, that the cylindrical ring part of the rubber packing is arranged in fixed rotative engagement on the pin and has a section which faces the rotary shaft seal and has a contour which descends on the outside toward the free end. This contour provides during installation that the free end of the axially projecting sealing lip, connected in one piece with the rotary shaft seal, extends in the direction of the reinforcement ring.

An improved securement of the rubber packing upon the reinforcement ring is realized by bending one end of the radial flange. Preferably, the bend is not provided about the entire circumference but rather formed in sections in the direction of the rotary shaft seal or aligned alternately.

The seal according to the invention includes further an arrangement of the rotary shaft seal with a reinforcement which is so disposed that the radially inwardly directed arm is arranged between the sealing element and the sealing lip, which bears upon the pin via a garter spring. This construction permits an advantageous, split arrangement and operation of the sealing lips of the rotary shaft seal. Thus, the sealing lips do not influence one another during installation or after installation. Corrosion can be avoided by making the reinforcement ring of rustproof material.

DETAILED DESCRIPTION OF THE DRAWINGS

Figure 2:
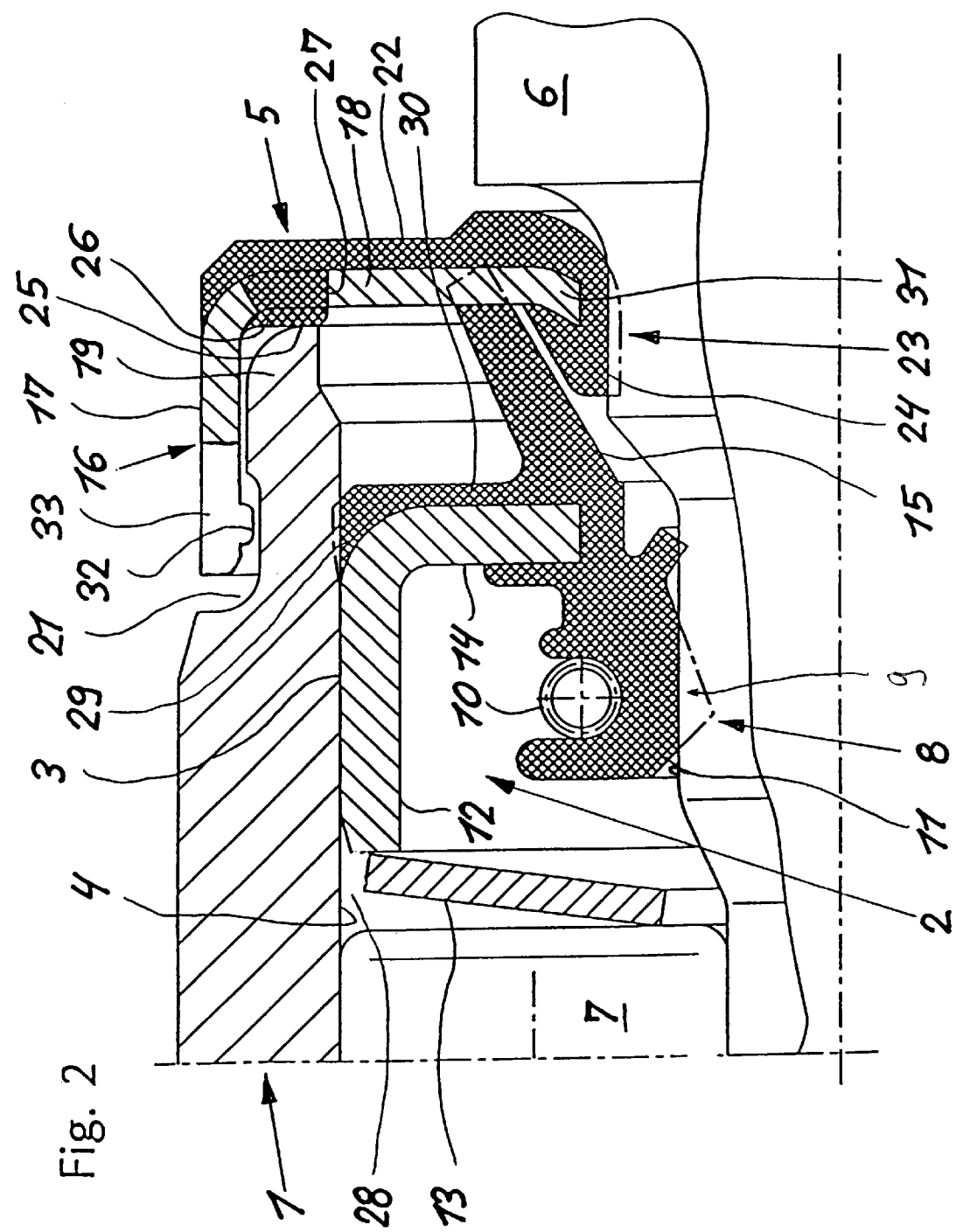

The drawings and the pertaining descriptions explain the invention. It is shown in:

FIG. 1 a sectional view of one half of a sealing arrangement according to the invention, including a reinforced rotary shaft seal with a sealing element placed anteriorly thereof;

FIG. 2 is, compared to FIG. 1, an alternative securement of the sealing element upon the bearing bushing.

DETAILED DESCRIPTION OF THE DRAWINGS

FIG. 1 shows a bearing bushing 1 which is provided with a sealing arrangement according to the invention. The bearing bushing 1 is depicted in installed state and includes a first seal 2 which bears via a reinforcement 3 in a force-fitting manner upon an inner wall 4 of the bearing bushing 1. Positioned anteriorly of the seal 2 is a seal element 5 which bridges an annular gap between a pin 6 and the bearing bushing 1. The pin 6 is rotatably supported by rolling bodies 7 in the bearing bushing 1. The seal 2 includes a rotary shaft seal 8 having a sealing lip 9 which, supported by the force of a garter spring 10, bears on the pin 6 against a portion 11 which is radially offset to the raceway of the rolling bodies 7. The reinforcement 3 of the seal 2 has an axially extending arm 12 having a free end for supporting a disk spring 13 inserted between the rolling bodies 7 and the reinforcement 3. Disposed on the radially inwardly directed arm 14 of the reinforcement 3 in the direction of the rolling bodies is the rotary shaft seal 8 and on the opposite side is a sealing lip 15 which is supported by the sealing element 5.

The configuration of the sealing element 5 includes a reinforcement ring 16 with a cylindrical extension 17 as well as a radially aligned flange 18. The extension 17 includes a radially recessed end portion 19 of the bearing bushing 1. The extension 17 has a free end formed with a radially inwardly directed bend 20 for engagement in a circumferential groove 21 of the bearing bushing 1. The bend 20 may be circumferential or formed in sections and is shaped, preferably after the sealing element 5 is installed, by a bending process without material removal. A disk-shaped rubber packing 22 is vulcanized to the flange 18 at the end face distant to the bearing bushing 1 and terminates in the area of the pin 6 in a cylindrical ring part 23 which is mounted in fixed rotative engagement with the outer surface area of the section 24 of the pin 6. In the area of an end face 25 of the bearing bushing 1, the rubber packing 22 forms a spacer element 26. The flange 18 is provided with circumferentially spaced recesses 27 which are filled with material of the rubber packing 22, thereby creating a single-piece connection between the spacer element 26 and the rubber packing 22.

An annular gap 28 is formed between the arm 12 of the reinforcement 3 of the seal 2 and the inner wall 4 of the bearing bushing I and sealed by an overlap 29 between the rubber packing 30 and the bore wall 4. The sealing lip 15 extends outwards from the rubber packing 30 and has a free end which is directly supported by the flange 18 of the reinforcement ring 16. To achieve this fitting position, the ring part 23 of the rubber packing 22 of the sealing element 5 is slanted on the outside, i.e. the outer contour of the ring part 23 tapers steadily toward the free end, as viewed from the flange 18. An improved securement or bond of the rubber packing 22 to the flange 18 of the reinforcement ring 16 is realized by bending the free end. The bend 31 extends preferably in the direction of the rolling bodies and may be designed about the entire circumference or in sections.

FIG. 2 shows a bearing bushing 1 in correspondence with the one shown in FIG. 1 as well as an identical seal 2. FIG. 2 differs from FIG. 1 merely in the manner of securement of the sealing element 5 upon the bearing bushing 1. The securement depicted in FIG. 2 is realized automatically when the sealing element 5 is installed, by providing the extension 17 with circumferentially spaced locking lugs 32 which spontaneously lock in the circumferential groove 21. An overlap between the outer surface area of the end zone 19 to a self-adjusting inner diameter of the locking lugs 32 is thereby so selected that the inner diameter can be compensated during assembly by the own elasticity of the extension 17. The installation may thereby be assisted by additionally providing the extension 17 with slits 33 which enable a widening of the extension to realize a simplified assembly.

What is claimed is:

1. Sealing arrangement between a bearing bushing (1) and a rolling bearing supported pin (6) of universal joints, comprising a seal (2) configured as reinforced rotary shaft seal, with a reinforcement (3) including an axial arm (12) arranged at an inner wall (4) of the bearing bushing (1), and a radial arm (14) for receiving the rotary shaft seal (8), wherein the rotary shaft seal (8) bears sealingly against the pin (6) via at least one sealing lip, and wherein a separate anterior seal is supported by an end face (25) of the bearing bushing (1) and positioned in axial direction anteriorly of the seal (2) to seal an annular gap between the pin (6) and the bearing bushing (1), characterized in that a reinforcement ring (16), which assumes the function of a protective cap, is connected in one piece with the anterior seal and positioned between the pin (6) and the bearing bushing (1) for formation of a sealing element (5) which is arranged and configured as follows:

a radial flange (18) of the reinforcement ring (16) extends to an area close to the pin (6), with a disk-like rubber packing (22) being vulcanized onto the flange (18) at an end face which is distant to the bearing bushing (1);

the rubber packing (22) circumscribes a free end of the flange (18) at formation of a cylindrical ring part (23) which projects out beyond both sides of the flange (18) and is secured in fixed rotative engagement with the pin (6);

a spacer element (26) is arranged between an end face (25) of the bearing bushing (1) and the flange (18) and connected in one piece with an end face of the rubber packing (22) via recesses (27) formed in the flange (18);

the seal (2) forms a sealing lip (15) which extends in the direction of the sealing element (5) and conically widens toward the free end, with the sealing lip being supported directly by the flange (18) of the reinforcement ring (16).

2. Sealing arrangement according to claim 1, characterized in that a cylindrical extension (17) of the reinforcement ring (16) is spaced from a radially recessed end zone (19) of the bearing bushing, with the extension (17) having a free end provided with a radially inwardly directed bend (20) which engages in a circumferential groove (21) of the bearing bushing (1).

3. Sealing arrangement according to claim 1, characterized in that the cylindrical extension (17) has a free end provided with circumferentially spaced locking lugs (32) which lock in the circumferential groove (21).

4. Sealing arrangement according to claim 1, characterized in that the section (24) of the ring part (23) extends in the direction of the rotary shaft seal (8) and is secured in fixed rotative engagement on the pin (6), said section having a steadily descending outer contour from the flange (18) toward the free end.

5. Sealing arrangement according to claim 1, characterized in that the radial flange (18) of the reinforcement ring (16) has a free end formed with a bend (31) in the direction of the rotary shaft seal (8).

6. Sealing arrangement according to claim 1, characterized in that the rotary shaft seal (8) is arranged between the radial arm (14) of the reinforcement (3) and the rolling bodies (7).

7. Sealing arrangement according to claim 1, characterized in that the reinforcement ring (16) is made from a rustproof material.

8. A sealing arrangement for sealing a bearing bushing against a rolling bearing supported pin of universal joints, said sealing arrangement comprising:
a first seal configured as reinforced rotary shaft seal and including a reinforcement having an axial arm, which is arranged at an inner wall of the bearing bushing, and a radial arm for receiving the rotary shaft seal, wherein the rotary shaft seal bears sealingly against the pin via at least one sealing lip and is arranged between the radial arm and rolling bodies for support of the pin; and
a second seal supported by an end face of the bearing bushing and positioned in axial direction anteriorly of the first seal to seal an annular gap between the pin and the bearing bushing, said second seal including a L-shaped reinforcement ring with a cylindrical extension which embraces a radially offset end zone of the bearing bushing at clearance, said reinforcement ring being configured for positive engagement in a circumferential groove of the bearing bushing.

9. The sealing arrangement of claim 8 wherein the cylindrical extension has a free end formed with locking lugs which are spaced about a circumference of the cylindrical extension and directed radially inwardly for engagement in the circumferential groove.

10. The sealing arrangement of claim 8 wherein the cylindrical extension has a free end formed with inwardly directed bends for engagement in the circumferential groove.

11. The sealing arrangement of claim 8 wherein the reinforcement ring has a radial flange which extends to an area close to the pin and has a free end formed at least along predetermined portions with a bend which is slanted relative to the pin to jut out laterally beyond the radial flange.

12. The sealing arrangement of claim 11 wherein the radial flange has a wall thickness, said bend jutting out laterally by not more than the wall thickness of the radial flange.

13. The sealing arrangement of claim 11, wherein the second seal includes a rubber packing so attached to the radial flange that the bend is embraced by the rubber packing on both sides.

14. The sealing arrangement according to claim 8, wherein the reinforcement ring is made from a rustproof material.

* * * * *